Nov. 25, 1941.     T. LOOS     2,264,085
ARTICLE PROVIDED WITH SLIDE FASTENER
Filed May 24, 1940     2 Sheets-Sheet 1
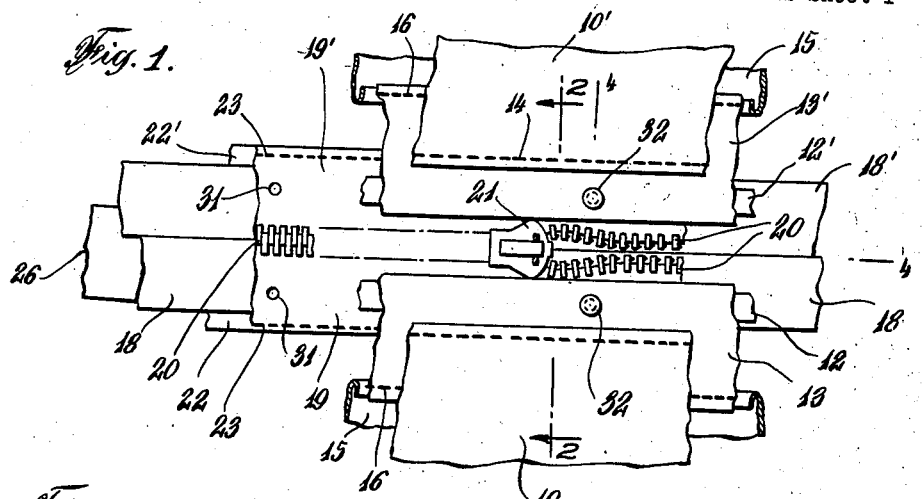
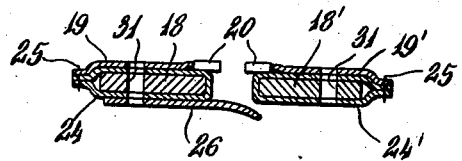
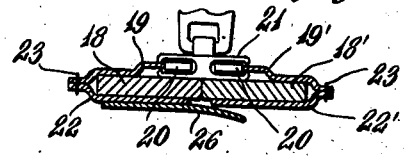
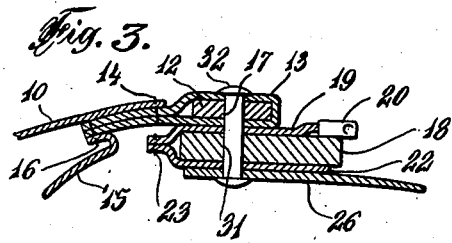
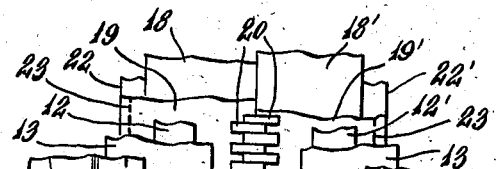
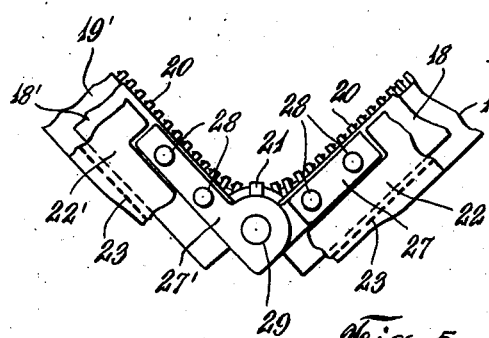
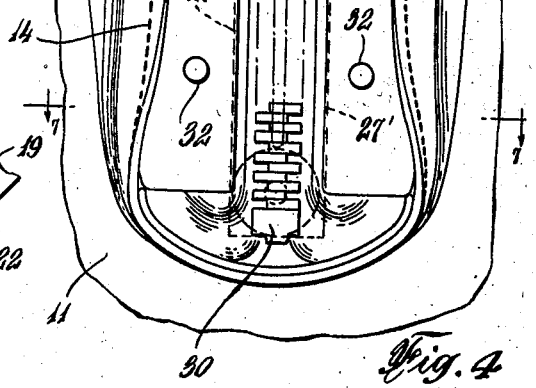
INVENTOR
*Theodore Loos*
BY
*Sheffield & Betts*
HIS ATTORNEYS Nov. 25, 1941.  T. LOOS  2,264,085
ARTICLE PROVIDED WITH SLIDE FASTENER
Filed May 24, 1940  2 Sheets-Sheet 2
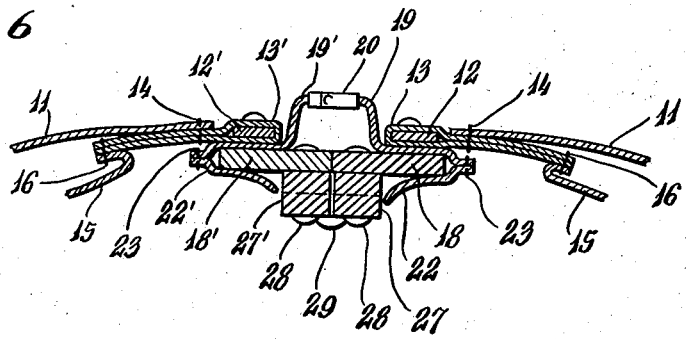
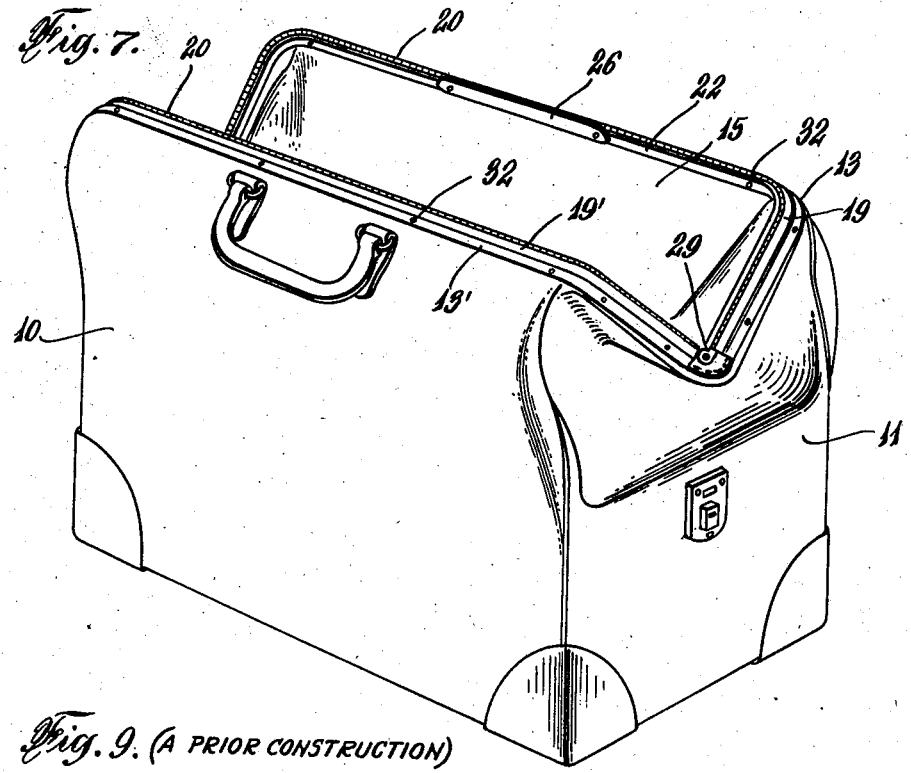
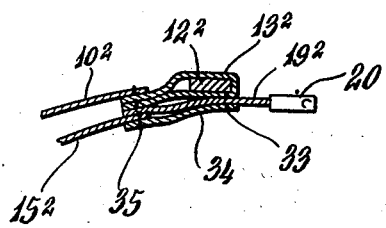
INVENTOR
Theodore Loos
BY
Sheffield & Betts
HIS ATTORNEYS Patented Nov. 25, 1941

2,264,085

UNITED STATES PATENT OFFICE 2,264,085

ARTICLE PROVIDED WITH SLIDE FASTENER

Theodore Loos, Tompkinsville, N. Y., assignor to Lovon Corporation, New York, N. Y., a corporation of New York Application May 24, 1940, Serial No. 336,905

9 Claims. (Cl. 190—48)

The primary object of my invention is to provide an article supplied with an interlocking slide fastener, which article is better and is also simpler and more economical to manufacture than other similar articles now available. A further object of my invention is to provide an article which is better adapted for replacement of damaged slide fasteners, etc., than present similar articles. Another object of my invention is to provide an article, closed by such a fastener, in which article the fastener elements are better supported, better protected, and less subject to damage or injury than in present similar articles. A still further and more specific object of my invention is to provide a traveling or other type of bag, utilizing an interlocking slide fastener to close the bag, which bag can be more easily and economically assembled and in which a damaged slide fastener can be more easily and economically replaced by a new fastener and in which the fastener elements are better supported and protected and less subject to damage or injury than heretofore.

In the following specification, I will describe my invention as applied to a traveling bag and, more specifically, to the type known as a club bag. It is to be understood, however, that by describing that particular application of my invention, I do not intend to limit in any way its scope; in other words, I wish it to be thoroughly understood that my invention is applicable not only to other types of bags (such, for example, among others, as Gladstone bags, brief cases, pocket-books, etc.) but also to numerous other articles which are not within the meaning of the word "bag."

In the accompanying drawings—

Figure 1 is a fragmentary view of the top of a bag (in this case of the type known as a club bag) embodying my invention in its preferred form, parts thereof being broken away for clarity of illustration;

Fig. 2 is a transverse section of the fastener assembly portion of my invention, taken on line 2—2 of Fig. 1, the fastener being closed and the sliding member of the fastener being shown therein;

Fig. 3 is a transverse section of a portion of a bag embodying my invention, the said section being taken on the line 4—4 of Fig. 1;

Fig. 4 is a fragmentary view, taken from the outside, of that portion of the end of a bag embodying my invention which is adjacent to the hinge, parts being broken for clarity of illustration;

Fig. 5 is a detail view, taken from the inside, of the slide fastener assembly portion of my invention adjacent the hinge, parts being broken away for clarity of illustration;

Fig. 6 is a transverse section of a portion of a bag embodying my invention, said section being taken on the line 7—7 of Fig. 5, looking in the direction of the arrows;

Fig. 7 is a perspective view of a club bag embodying my invention;

Fig. 8 is a transverse section of a modified form of the fastener assembly portion of my invention, the fastener being open and the two parts thereof separated; and Fig. 9 is a fragmentary cross section of a present common type of construction of a bag supplied with a slide fastener, such section, in general, corresponding to that section of a bag embodying my invention that is shown in Fig. 4.

In their present form, club bags to which a slide fastener has been applied are commonly constructed as shown in Fig. 9 or in an equivalent manner. The bag comprises metal frame members $12^2$ adjacent the free edges of the bag material $10^2$ and so formed as to surround the opening in the bag. In the course of constructing the bag, the frame members, prior to being bent or shaped, are covered with folded strips $13^2$ of leather or other suitable material to which the fabric tape $19^2$ carrying the prongs 20 of the slide fastener and a further strip 34 of suitable material, such as leather, have been sewed, as shown at 33. The frame covers $13^2$, together with the fastener tape and the strip 34, are then bent to their final form and, thereafter, the free edges of the bag material are joined to the frame members by a separate row of stitches 35, such stitches ordinarily passing through six layers of material—i. e., the bag material $10^2$, the two layers of the frame covers $13^2$, the fastener tape $19^2$, the strip 34, and the bag lining $15^2$. When it is desired to replace the slide fastener, it is necessary to rip out the stitches 35 by which the frame members are affixed to the bag material and to the lining in order to remove the bag frame from the bag. To replace the fastener elements, it is then necessary either to rip out the other row of stitches 33 or to slit the frame covers $13^2$ so that the damaged fastener elements may be discarded. Ordinarily, it is not possible to salvage the frame covers. Before new fastener elements can be affixed to the bag, it is necessary to straighten out the frame members, to affix the new fastener tapes to new frame covers, and to re-cover the frames; the frames must then be re-bent to desired form and the whole assembly again stitched to the bag material and lining. In performing this latter operation, it is ordinarily necessary to insert the new stitches in the same holes in the bag material so as to avoid weakening of the same and to avoid an appearance of patching. It will be seen from what has just been said that substantially all of if not all of the same steps are involved in replacing a damaged fastener as were originally involved in assembling the bag. This method of replacing a slide fastener requires the use of skilled labor, is a comparatively difficult and expensive operation, and results in waste of material. As a result, the cost of repairs is a substantial item for bag manufacturers; in fact, in the case of cheap bags, the cost of replacing a damaged fastener may equal or exceed the original cost of the bag.

My invention, on the other hand, provides a bag which is simple and economical to manufacture and also makes it possible to replace a damaged fastener at a cost of from one-third to one-fourth of the present cost and by means of operations that can be carried out quickly and easily by unskilled labor and with the minimum waste of material. Other advantages of my invention will appear hereinafter.

A preferred form of my invention, as applied to a club bag, is shown in the drawing. The numerals 10, 10' illustrate the side walls of the bag and the end walls are shown at 11. As the general construction of a bag of this type is well understood it does not appear necessary further to describe the walls of the bag nor to describe the bottom thereof or the manner in which the walls and bottom are shaped and affixed to each other. It is of course understood that, in a bag of this type, the end walls are partially split so that the top of the bag may be opened; they are also so shaped that, when the bag is fully open, the free edges of both the side walls and the split edges of the end walls lie in a single plane. These edges of the side and end walls (which edges also define the opening in the bag) are provided with rigid U-shaped frame members 12, 12' which are affixed thereto. Each of the frame members is preferably suitably covered with a folded strip 13, 13' of leather or other suitable material, the contacting edges being extended underneath the adjacent free edge of the bag material and stitched thereto as indicated at 14. The lining 15 is also stitched as indicated at 16 to the edges of the frame covers 13, 13'; preferably, the stitching 16 is separate from the stitching 14 (as shown in Figs. 1, 3, and 6), but the stitching 14 may also hold the lining in place, in which case no separate stitching 16 is required.

When a bag embodies my present invention, the portions thereof thus far described constitute the structure of the bag proper and the elements thus far described are adapted to have an interlocking slide fastener assembly affixed to them without further modification other than the drilling of holes 17 in the frame members for a purpose which will be hereinafter described. In mounting the fastener assembly, as well as in detaching it and replacing it with a new fastener assembly, none of the elements of the bag thus far described need be taken apart; in other words, the bag proper is a permanent assembly to which the initial or new fastener assemblies may be affixed as desired without removing the frame members from the bag and without even removing any of the stitching at 14 or 16.

Forms of slide fastener assembly which can be applied to the bag or other article in accordance with my present invention are shown and described in my co-pending application Serial No. 324,503, filed March 18, 1940, to which application reference is made for a detailed description thereof and for a recital of various advantages which result from the application to various articles of fastener assemblies such as are shown therein.

In general, the form of slide fastener assembly which is utilized in my present invention comprises two rigid strips 18, 18' preferably of metal, which strips are bent to have substantially the same form as the frame members 12, 12' of the bag. The slide fastener elements are of conventional form and, as is well understood, comprise strips 19, 19' of flexible material, ordinarily fabric, and, affixed to one lateral edge of each of such strips, a series of prongs 20 of the fastener; each series of prongs being adapted to be made, by means of the sliding locking device 21, to interlock with the other series to close the fastener. The flexible strips or tapes of the slide fastener are associated with the rigid strips 18, 18' in some suitable manner. When the arrangement of Figs. 1 to 7, inclusive, is utilized, supplementary flexible strips 22, 22' are provided and one edge of these strips is stitched, as indicated at 23, to that edge of the fastener tapes 19, 19' which is opposite to that to which the prongs 20 are affixed. The rigid strips 18, 18' are then placed between the fastener tapes 19, 19' and the supplementary strips 22, 22', as clearly shown in Fig. 2.

In Fig. 8 a modified method of associating the fastener elements with the rigid strips 18, 18' is shown. In this arrangement, strips 24, 24' of suitable material, such as leather, etc., are folded around the rigid strips 18, 18' to cover the latter. The flexible strips 19, 19' of the slide fastener are then stitched to the free edges of the covering strips 24, 24', as shown at 25.

If desired, a guide member 26 may be so associated with one of the rigid strips as to extend along a portion of the top of the bag. One edge of this member projects beyond the inner edge of the rigid strip with which it is associated and extends under the complementary rigid strip when the fastener is closed. This guide member facilitates proper alinement of the adjacent edges of the rigid strips 18, 18' when the edges of the bag are brought together to close it.

Preferably, the relative position of the fastener elements and the rigid strips 18, 18' should be such that, when the fastener is closed, the fastener tapes and prongs will lie substantially flat on the surfaces of the rigid strips, and the inner edges of the rigid strips, or the parts of the covers 24, 24' which cover the inner edges of the strips, will be in contact or substantially so. In order to accomplish this, only the tips of the prongs 20 should project beyond the inner edge of the rigid strip, 18 or 18', on which the prongs are mounted (or beyond that part of the cover, 24 or 24', which covers the inner edge of the rigid strip), when the fastener tape and elements lie flat on the rigid strip or its cover. Although it might appear that this relative positioning would block the action of the sliding locking member 21, yet I have found that such is not the case; the sliding member will operate smoothly and positively even if, after the prongs have been interlocked and the fastener closed, the inner edges of the strips (or those parts of their covers which cover those edges) are in contact. There is apparently sufficient elasticity and flexibility in the normal and conventional fastener tapes 19, 19' to permit this action. In fact, I have also found that, with proper relative positioning of the parts, the rigid strips, when the fastener is closed, will be so close together that it is difficult to insert a knife-blade between them. Such positioning of the parts insures maximum support and protection for the fastener elements.

When my invention is utilized in a bag (such as a club bag) having U-shaped frame members and, therefore, U-shaped rigid strips 18, 18' with which the slide fastener elements are associated, hinges may be used at the corners of the bag opening by affixing them directly to the rigid strips 18, 18'. Any suitable type of hinge may be used such, for example, as the type having two bars 27, 27' which are riveted as at 28 to the rigid strips and which are perforated to receive the pin 29. It will, of course, be understood that the series of prongs of the fastener must, at the end where the sliding member 21 rests when the fastener is open, extend far enough down the upright portions of the rigid strips to permit the bag to which the fastener is applied to open freely about the hinges as pivots without placing a strain on the fastener. Thus, for example, the stop 30 at that end of the fastener must be below the pivot of the hinge. Preferably, to provide easy operation of the sliding locking member 21 at the ends of the fastener, the fastener tapes 19, 19' should, at the ends of the fastener assembly, be so adjusted, with respect to the rigid strips 18, 18', that there will be a substantial space between the prongs 20 and the adjacent surfaces of the rigid strips—as clearly shown, for example, in Fig. 6.

To affix the fastener assembly to the bag, the rigid strips 18, 18' are drilled, as at 31, at places corresponding to the holes 17 in the bag frame members 12, 12' already referred to. The fastener assembly is then mounted on the bag merely by riveting the rigid strips 18, 18', bearing the fastener elements, to the bag frame members 12, 12', as shown at 32.

From the foregoing, it will be seen that the bag, with the frame members 12, 12' and lining 15, can be made up in its entirety prior to the application thereto of the slide fastener assembly. It will also be seen that the slide fastener assembly—including hinges for the bag—can thereafter be very easily affixed to the bag by means of the rivets 32 or other suitable fastening means such as bolts, etc. In the event that the fastener is damaged or broken and it becomes necessary to replace it with a new one, the rivets 32 can be punched out and nothing more is necessary to remove the fastener assembly from the bag. To attach a new fastener it is only necessary to apply new fastener elements to the rigid strips 18, 18'—which can be done without straightening out and re-bending the strips—and then to affix the new assembly to the bag, as by inserting new rivets 32. Thus, the only stitching which is required in replacing a fastener is the stitching 23 or 25 by means of which the fastener tapes are associated with the rigid strips. As will be seen, this involves two or, at most, three layers of material and is therefore a simple operation. If the arrangement of Figs. 2 and 3 is utilized, it is also possible to keep on hand a supply of fastener tapes sewed to the strips 22, 22' so that, when a new fastener is to be applied, no stitching will be necessary.

It will be apparent to those familiar with the art of making bags, etc., that my invention provides an extremely simple and economical method both of mounting the original fastener on the bag and of replacing a damaged fastener with a new one, and that a very substantial saving results from the use of my invention both in the initial assembly and in repairs.

In addition to advantages resulting from my invention which have already been pointed out, there are other substantial advantages. Thus, the presence of the rigid strips 18, 18' underlying the fastener elements lends substantial support and protection to them. The possibility of injury to the fastener elements, either from external sources or from the catching of portions of the contents of the bag between the prongs of the fastener or between the prongs and the sliding element is practically entirely avoided; also, the presence of the rigid strips protects the contents of the bag from injury which might result from operation of the fastener. Furthermore, the closing of a bag by means of the fastener is facilitated because, if the user makes sure that nothing projects from the bag between the edges of the rigid strips 18, 18', the fastener can be opened and closed at will without danger of jamming or injury. Furthermore, the mounting of the hinges of the bag on the rigid strips which carry the fastener elements substantially reduces the lateral strain on the fastener elements. Also, with this hinge arrangement, the bag will stay open while it is being packed whereas present bags of such type, when supplied with a slide fastener, will repeatedly close on the arms of the person who is packing it.

A still further advantage of a bag utilizing my present invention is that lateral play of the fastener elements is largely eliminated; as a result, shock to the elements, resulting from lifting, carrying, or dropping the bag, is substantially reduced.

Other advantages resulting from the utilization of my invention will be apparent to those skilled in the art.

It is to be understood that my invention is by no means limited to the application thereof to bags and that my description of its utilization in a club bag is given solely as an example and to illustrate one method in which it may be used. It is also to be understood that various modifications or alterations may be made in the fastener assembly and in the method of constructing the article to which it is applied, in addition to those indicated in the foregoing description, provided they come within the scope of the claims.

I claim:

1. The combination comprising an article having a pair of edges adapted to be fastened together by means of a slide fastener, each edge being provided with a rigid member; a pair of independent rigid strips; two flexible strips, each carrying prongs of an interlocking slide fastener and being associated with one of the rigid strips; each of said rigid strips being detachably affixed to the inner side of the corresponding rigid member, said flexible strips being clamped between said rigid members and said rigid strips; and sliding means for causing said prongs to interlock to close the fastener.

2. The combination comprising an article having an edge to which elements of a slide fastener are to be affixed, said edge being reinforced by a rigid member; an independent rigid strip; and a flexible strip carrying prongs of the fastener and associated with said rigid strip, said flexible strip being detachable from said rigid strip without deformation of the latter; the rigid strip, bearing the flexible strip, being detachably attached to the free edge of the article by means passing through the rigid strip, the flexible strip, and the rigid member.

3. A bag having an opening therein; two rigid frame members, one extending along each edge of said opening, said members being spaced from each other when said bag is closed; means affixing said frame members to the bag material; and an interlocking slide fastener assembly for said opening, said assembly being affixed to said frame members and detachable therefrom as a unit and comprising two rigid strips having substantially the same shape as said frame members, a series of prongs associated with each rigid strip, the prongs of each series being adapted to interlock with the prongs of the other series, and a sliding member adapted to cause said prongs to interlock to close the opening in the bag, said rigid strips being substantially in contact with each other when said fastener is closed and the elements thereof are under tension.

4. A bag having an opening therein; two rigid frame members, one extending along each edge of said opening, said members being spaced from each other when said bag is closed; means affixing said frame members to the bag material; and an interlocking slide fastener assembly for said opening, said assembly being detachably affixed to said frame members and comprising two rigid strips having substantially the same shape as said frame members, a series of prongs associated with each rigid strip, the prongs of each series being adapted to interlock with the prongs of the other series, and a sliding member adapted to cause said prongs to interlock to close the opening in the bag, each of said rigid strips being located adjacent the inner side of the corresponding frame member.

5. A bag having an opening therein; two rigid frame members, one extending along each edge of said opening, said members being spaced from each other when said bag is closed; means affixing said frame members to the bag material; and an interlocking slide fastener assembly for said opening, said assembly being detachably affixed to the inner sides of said frame members and comprising two rigid strips having substantially the same shape as said frame members, two flexible strips each carrying a series of prongs and each associated with one of said rigid strips, the prongs of each series being adapted to interlock with the prongs of the other series, and a sliding member adapted to cause said prongs to interlock to close the opening in the bag, each of said flexible strips being clamped between one of said frame members and the associated rigid strip by means independent of the means affixing the frame members to the bag materials.

6. The combination comprising an article having an opening therein, a pair of stiffening members affixed to the edges of the opening, an independent pair of rigid strips, each carrying one of the series of prongs of an interlocking slide fastener, the prongs of each series being adapted to interlock with the prongs of the other series, each rigid strip being affixed, by means independent of the means affixing the stiffening member to the edge of the opening, to the inner side of one of the stiffening members and being detachable therefrom without deformation of the rigid strip, and sliding means for causing said prongs to interlock to close said opening, said sliding means being provided with means by which it may be manually operated through the space between said stiffening members.

7. The combination comprising an article having an opening therein, a pair of frame members affixed to the edges of the opening, an independent pair of rigid strips, each carrying one of the series of prongs of an interlocking slide fastener, the prongs of each series being adapted to interlock with the prongs of the other series, each rigid strip being affixed to the inner side of one of the frame members, and sliding means for causing said prongs to interlock to close the opening; the adjacent edges of the rigid strips being substantially in contact.

8. The combination comprising an article having a pair of edges adapted to be fastened together by means of a slide fastener; a pair of rigid members; means affixing said rigid members to the edges of the article; and an interlocking slide fastener assembly for said edges, said assembly being detachably affixed to the inner sides of the rigid members by means independent of the means affixing the rigid members to the edges of the article and comprising a pair of rigid strips; two flexible strips, each carrying prongs of the fastener and each being associated with one of the rigid strips and being clamped between one of said rigid members and the corresponding rigid strip; and a sliding member for causing said prongs to interlock to close the fastener, said sliding member being provided with means whereby it may be manually operated; said rigid members, rigid strips, and flexible strips being so positioned relative to each other that, when the fastener is closed and the elements thereof are under tension, said rigid members are spaced apart sufficiently to permit said means for manually operating said sliding member to pass therebetween and the inner edges of said rigid strips are substantially in contact and underlie said prongs.

9. The combination comprising an article having a pair of edges adapted to be fastened together by means of a slide fastener, each edge being provided with a rigid member; a pair of independent rigid strips, each carrying a flexible strip bearing one of the complementary series of the prongs of an interlocking slide fastener; each flexible strip being clamped between one of said rigid strips and the corresponding rigid member; and sliding means for causing said series of prongs to interlock to close the fastener; said rigid strips being detachable from said rigid members without deformation of said rigid strips.

THEODORE LOOS.